UNITED STATES PATENT OFFICE.

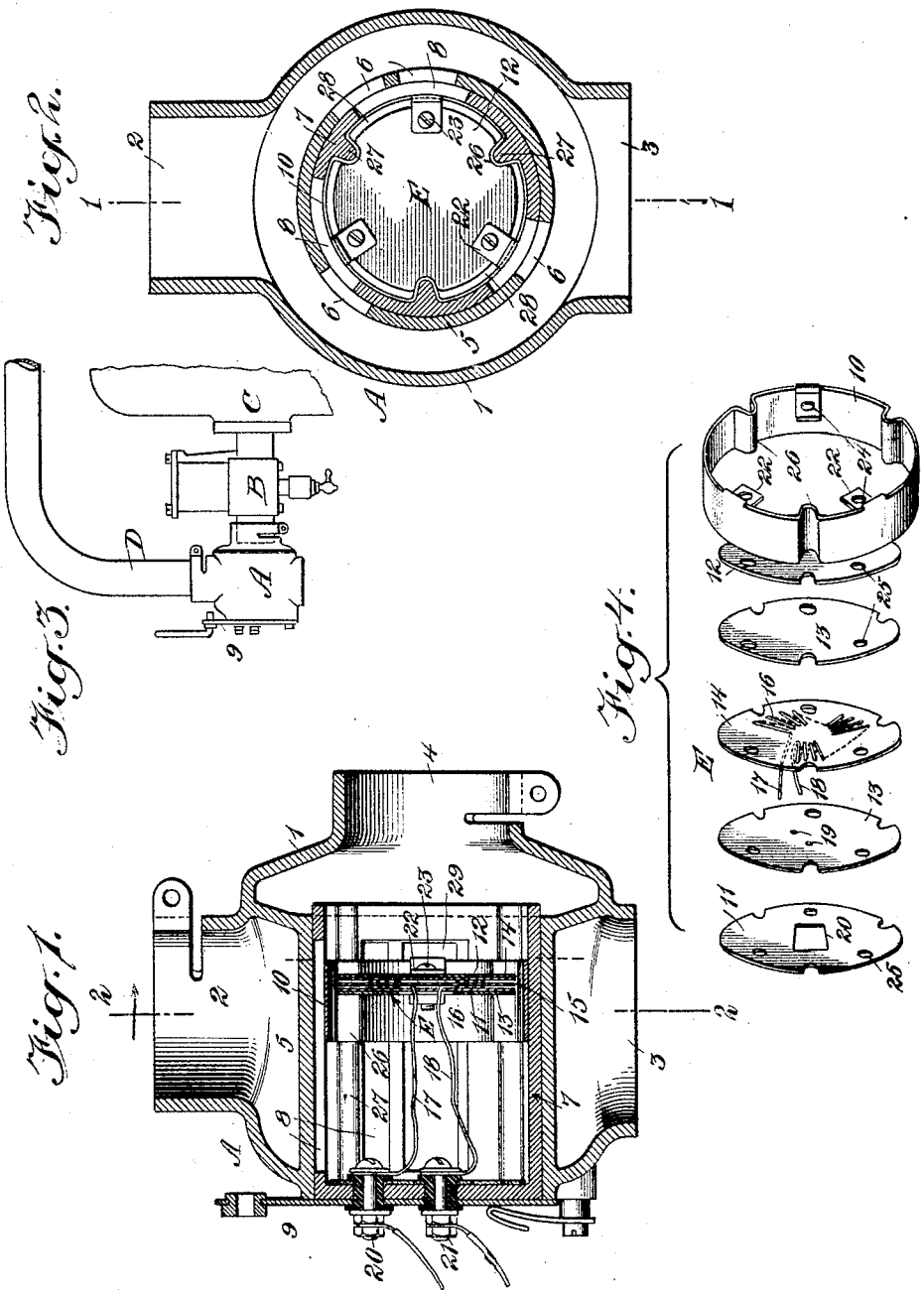
J. M. NATER.
ELECTRIC HEATER FOR CARBURETER AIR INTAKES.
APPLICATION FILED FEB. 6, 1917.
1,244,234. Patented Oct. 23, 1917.
WITNESSES
INVENTOR
J. M. Nater.
BY
ATTORNEYS

JEAN M. NATER, OF WEST HOBOKEN, NEW JERSEY.

ELECTRIC HEATER FOR CARBURETER AIR-INTAKES.

1,244,234.  Specification of Letters Patent.  Patented Oct. 23, 1917.

Application filed February 6, 1917. Serial No. 146,883.

*To all whom it may concern:*

Be it known that I, JEAN M. NATER, a citizen of the United States, and a resident of West Hoboken, in the county of Hudson and State of New Jersey, have invented a new and Improved Electric Heater for Carbureter Air-Intakes, of which the following is a full, clear, and exact description.

This invention relates to electric heater attachments for carbureters to facilitate the starting of an engine in cold weather by heating the air intake and also heating the interior of the carbureter.

The invention has for its general objects to provide an electric heater especially adapted for an air intake controlling device of that type used in connection with the present model of Hudson automobile, said heater being of simple, novel and inexpensive construction, and so designed as to be capable of application to the air intake controlling device without any change in construction thereof.

A more specific object of the invention is the provision of a heating attachment for an air intake controlling device whereby the said device can be closed to confine the air therein while the electric heater is in use, whereby a limited volume of air will be heated. Thereby the heat will be more rapidly radiated to the interior of the carbureter to heat the nozzle and walls of the mixing chamber so that while the controlling device is closed and the engine cranked, the explosive mixture will be heated to the desired temperature for explosion in the engine. It will be understood that the heater will be connected in circuit with a suitable source of current on the car, and that the circuit will be open at all times except when it is desired to heat the air intake device and carbureter, as in starting in cold weather. After the engine is started, the air controlling device can be opened.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views.

Figure 1 is a central vertical section of an air intake controlling device and heater taken on the line 1—1, Fig. 2;

Fig. 2 is a vertical transverse section taken on the line 2—2, Fig. 1;

Fig. 3 is a side view of the air intake controlling device and carbureter; and

Fig. 4 is a perspective view of the heater shown with its parts in disassembled relation.

Referring to the drawing, A designates an air intake controlling device, B a carbureter connected therewith, C an engine cylinder, and D the hot air supply pipe connected with the device A.

The air intake controlling device A comprises a chambered body 1 having upper and lower openings 2 and 3 and a rear opening 4, the opening 3 serving to admit cold air to the body 1, and the opening 2 serving to admit heated air, since the pipe D is connected with such opening and leads therefrom to a point in proximity with the exhaust pipe of the engine. The opening 4 is connected with the air intake of the carbureter B. Within the casing or body 1 is a cylindrical wall 5 spaced from the body 1 so as to provide a substantially annular air distributing chamber, and the wall 5 has ports 6 to permit air to pass into the space inclosed by the wall 5. Rotatably mounted in the cylindrical wall 5 is a cylindrical valve 7 which has ports 8 adapted to be moved into and out of registry with the ports 6, whereby the amount of air passing into the carbureter can be regulated at will. The outer end of the valve is closed while the inner end communicates with the opening 4 that leads to the carbureter. On the outer end of the valve is an arm 9 that is adapted to be connected with a controlling lever operable from the dashboard.

Within the valve 7 is an electric heater E whereby the air on the intake side of the carbureter as well as the walls of the carbureter itself can be heated. This electric heater comprises a band 10 which holds a heating wafer or disk formed of outer metal plates 11 and 12 and mica plates 13, 14 and 15, there being a heating element or wire 16 carried by the mica plate 14. The heating wire is sewed on the plate 14 by being passed back and forth through the same, and the ends 17 and 18 of the wire pass through openings 19 and 20 in the plates 13 and 11. The ends of this wire are connected with binding posts 20 and 21 carried on and insulated from the outer wall of the valve 7. The plates that form the heating disk are held on the band 10 by means of lugs 22 and bolts 23 which pass through apertures 24 in the lugs and apertures 25 in the several plates. The band 10 snugly fits within the cylindrical valve and it is provided with off-set V-shaped portions 26 to fit the longitudinal ribs 27 of the valve 7. The heating disk is of considerably smaller diameter than the internal diameter of the band 10 or of the valve, so that arcuate ports 28 will be provided for air to pass the edges of the heating disk. The electric heater is preferably placed adjacent the inner end of the valve without, however, completely closing the inner ends of the ports 6 and 8, as will be clearly seen at 29, Fig. 1.

When the heater is to be used to start a cold engine the valve 7 is adjusted so as to close the ports, whereby a confined body of air will be held in the valve and carbureter. The circuit of the heater is now closed and current is allowed to flow through the heater for a few minutes so as to effectively heat the confined body of air, the valve of the device A, and the walls of the mixing chamber of the carbureter. After a suitable lapse of time the engine is cranked and immediately started, since the air passing to the carbureter will be of such a temperature as to produce an effective carburetion and easy ignition.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a carbureter and an air intake controlling device connected therewith and comprising a chambered body having a valve therein for regulating the volume of air that can pass to the carbureter, with an electric heater mounted in and movable with the valve.

2. The combination of a carbureter and an air intake controlling device including means for opening or closing the air passage to the carbureter, with an electric heater carried by the said means.

3. An air intake controlling device for a carbureter including a chambered body having a ported wall, a movable valve associated with the said wall for controlling the port or ports thereof, and an electric heater mounted in and carried by the valve.

4. An air intake controlling device for a carbureter including a chambered body having a ported wall, a valve associated with the said wall for controlling the port or ports thereof, and an electric heater mounted in and carried by the valve, said heater comprising a band, and a heating element carried by the band and providing between itself and the band, ports for the passage of air.

JEAN M. NATER.